(12) United States Patent
Nambiar et al.

(10) Patent No.: US 11,212,218 B2
(45) Date of Patent: Dec. 28, 2021

(54) METHOD AND SYSTEM FOR MESSAGE BASED COMMUNICATION AND FAILURE RECOVERY FOR FPGA MIDDLEWARE FRAMEWORK

(71) Applicant: Tata Consultancy Services Limited, Mumbai (IN)

(72) Inventors: Manoj Karunakaran Nambiar, Thane West (IN); Swapnil Rodi, Mumbai (IN); Sunil Puranik, Pune (IN); Mahesh Damodar Barve, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 286 days.

(21) Appl. No.: 16/535,803

(22) Filed: Aug. 8, 2019

(65) Prior Publication Data

US 2020/0053004 A1    Feb. 13, 2020

(30) Foreign Application Priority Data

Aug. 9, 2018 (IN) .............................. 201821030011

(51) Int. Cl.
*H04L 12/28* (2006.01)
*H04L 12/703* (2013.01)
*H04L 12/24* (2006.01)
*H04L 29/06* (2006.01)

(52) U.S. Cl.
CPC .......... *H04L 45/28* (2013.01); *H04L 41/0816* (2013.01); *H04L 65/102* (2013.01); *H04L 65/80* (2013.01); *H04L 69/163* (2013.01); *H04L 69/164* (2013.01)

(58) Field of Classification Search
CPC ....................................................... H04L 45/28
See application file for complete search history.

(56) References Cited

U.S. PATENT DOCUMENTS

| | | | |
|---|---|---|---|
| 7,688,820 B2 * | 3/2010 | Forte | H04L 65/4007 370/389 |
| 8,145,945 B2 | 3/2012 | Lee | |
| 8,756,417 B1 * | 6/2014 | Gardner | G06F 21/10 713/164 |
| 9,215,131 B2 | 12/2015 | Frey et al. | |
| 10,686,872 B2 * | 6/2020 | Pope | H04L 49/30 |

(Continued)

*Primary Examiner* — Guang W Li
(74) *Attorney, Agent, or Firm* — Finnegan, Henderson, Farabow, Garrett & Dunner, LLP

(57) ABSTRACT

The disclosure herein describes a method and a system for message based communication and failure recovery for FPGA middleware framework. A combination of FPGA and middleware framework provides a high throughput, low latency messaging and can reduce development time as most of the components can be re-used. Further the message based communication architecture built on a FPGA framework performs middleware activities that would enable reliable communication using TCP/UDP between different platforms regardless of their deployment. The proposed FPGA middleware framework provides for reliable communication of UDP based on TCP as well as failure recovery with minimum latency during a failover of an active FPGA framework during its operation, by using a passive FPGA in real-time and dynamic synchronization with the active FPGA.

11 Claims, 6 Drawing Sheets

(56) References Cited

U.S. PATENT DOCUMENTS

| | | | | |
|---|---|---|---|---|
| 2004/0141386 | A1* | 7/2004 | Karlsson | G06F 30/34 |
| | | | | 365/200 |
| 2012/0007634 | A1* | 1/2012 | Yanagisawa | G05B 23/0213 |
| | | | | 326/41 |
| 2013/0159452 | A1* | 6/2013 | Saldana De Fuentes | |
| | | | | G06F 15/7867 |
| | | | | 709/213 |
| 2016/0050085 | A1* | 2/2016 | Barnes | H04L 47/193 |
| | | | | 370/389 |
| 2016/0173104 | A1* | 6/2016 | Vassiliev | H03K 19/17704 |
| | | | | 326/41 |
| 2017/0373953 | A1* | 12/2017 | George | H04L 43/04 |
| 2018/0234383 | A1* | 8/2018 | Daugherty | G06F 30/34 |
| 2018/0267870 | A1* | 9/2018 | Bhatia | G06F 11/2038 |
| 2018/0285295 | A1* | 10/2018 | Abel | G06F 21/606 |
| 2019/0007348 | A1* | 1/2019 | Rohrl | H04L 49/351 |
| 2019/0296964 | A1* | 9/2019 | Nambiar | H04L 43/106 |
| 2020/0321965 | A1* | 10/2020 | Samsoniuk | H03K 19/17748 |

\* cited by examiner

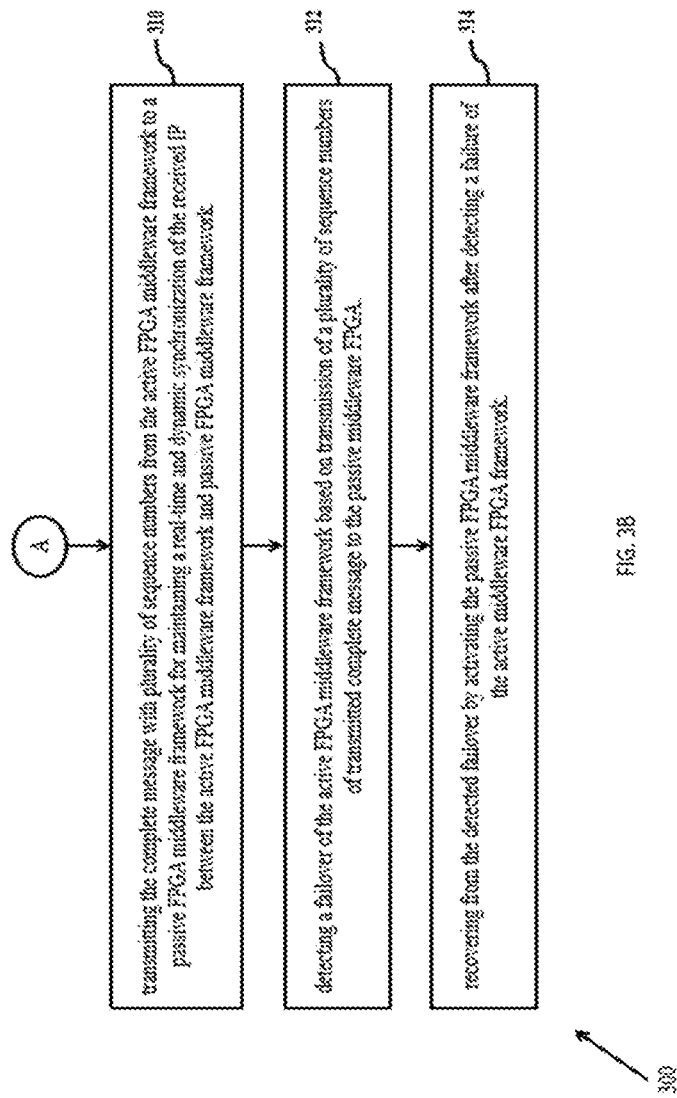

METHOD AND SYSTEM FOR MESSAGE BASED COMMUNICATION AND FAILURE RECOVERY FOR FPGA MIDDLEWARE FRAMEWORK

CROSS-REFERENCE TO RELATED APPLICATIONS AND PRIORITY

The present application claims priority from Indian provisional patent application no. 201821030011, filed on Aug. 9, 2018. The entire contents of the aforementioned application are incorporated herein by reference.

TECHNICAL FIELD

The disclosure herein generally relates to the field of message based communication and failure recovery, and, more particularly, to a method and system for message based communication and failure recovery for field-programmable gate array (FPGA) middleware framework.

BACKGROUND

Message based architecture or Message-Oriented Middleware (MOM) is a middleware that supports sending and receiving messages between distributed systems. The message based architecture allows software components that have been developed independently on different platforms to interact with one another.

A field-programmable gate array (FPGA) is an integrated circuit designed such that it may be configured by a designer or developer after manufacturing. FPGAs have established themselves as one of the preferred digital implementation platforms in current industrial applications/enterprise applications features.

A combination of FPGA and middleware framework provides a high throughput low latency messaging and memory access service for applications regardless of their type/format of deployment. Further FPGA middleware framework can positively reduce development time as most of the components can be re-used thus enabling a designer or a developer to focus on application functionality without worrying about implementing communications/messaging or memory requirements.

The FPGA middleware framework which are generally used in critical systems need to ensure a high level of availability by minimizing unplanned downtime caused by software and hardware defects, hence the FPGA middleware framework must also provide fault tolerance and quick recovery features.

SUMMARY

Embodiments of the present disclosure present technological improvements as solutions to one or more of the above-mentioned technical problems recognized by the inventors in conventional systems. For example, in one embodiment, a method for message based communication and failure recovery for FPGA middleware framework is provided. The method includes receiving a plurality of Internet Protocol (IP) from a plurality of third party application as input to an active FPGA middleware framework, wherein the plurality of IP comprises a plurality of fragments and a sequence numbers corresponding to each of the plurality of fragments, wherein the plurality of fragments of the received plurality of IP comprises a Transmission Control Protocol (TCP) or a User Datagram Protocol (UDP). The method further includes re-assembling the received TCP and the received UDP, wherein the re-assembling is based on the sequence number of the plurality of fragments. The method further includes checking the re-assembled UDP for a missing sequence of fragments and requesting a re-transmission of the missing sequence of re-assembled UDP over a TCP channel from a plurality of third party application. The method further includes inserting the re-assembled UDP and the re-transmitted missing sequence of UDP to form a complete message with plurality of sequence numbers in the active FPGA middleware framework. The method further includes transmitting the complete message with plurality of sequence numbers from the active FPGA middleware framework to a passive FPGA middleware framework for maintaining a real-time and dynamic synchronization of the received IP between the active FPGA middleware framework and passive FPGA middleware framework. The method further includes detecting a failover of the active FPGA middleware framework based on transmission of a plurality of sequence numbers of transmitted complete message to the passive FPGA middleware, wherein the step of detecting a failover of the active FPGA middleware framework further comprises transmitting the complete message with plurality of sequence numbers from the active FPGA middleware framework to the passive FPGA middleware framework, receiving and saving the complete message with plurality of sequence numbers in the passive FPGA middleware framework for processing, transmitting a receipt from passive FPGA to active FPGA middleware framework, wherein the receipt comprises a saved previous consecutive sequence number of received complete message and finally detecting a failover of the active FPGA middleware framework based comparison of the received sequence number with the saved previous consecutive sequence in the passive FPGA. The method further includes recovering from the detected failover by activating the passive FPGA middleware framework after detecting a failure of the active FPGA middleware framework.

In another aspect, a system for message based communication and failure recovery for FPGA middleware framework is provided. The system includes a reassembly logic module—one configured for receiving a plurality of Internet Protocol (IP) from a plurality of third party components as input to an active FPGA middleware framework and for re-assembling the received TCP and the received UDP, wherein the re-assembling is based on the sequence number of the plurality of fragments. Further the system includes a sequence check module configured for checking the re-assembled UDP for a missing sequence of fragments and requesting a re-transmission of the missing sequence of re-assembled UDP over a TCP channel from a plurality of third party components. Further the system includes a sequence insert module configured for inserting the re-assembled UDP and the re-transmitted missing sequence of UDP to form a complete message with plurality of sequence numbers in the active FPGA middleware framework. Further the system includes a switch over logic module configured for detecting a failover of the active FPGA middleware framework based on transmission of a plurality of sequence numbers of transmitted complete message to the passive FPGA middleware framework and for recovering from the detected failover by activating the passive FPGA middleware framework after detecting a failure of the active FPGA middleware framework. The system further includes a reassembly logic module—two that is configured for receiving and re-assembling the missing sequence of re-assembled UDP is transmitted over the TCP channel after encapsulating the missing sequence of re-assembled UDP over TCP. The system further includes a circular buffer module configured for saving the complete message with plurality of sequence numbers. The system further includes temperature monitoring and heartbeat detection module configured to monitor an FPGA middleware framework for increase in temperature and also monitors the general well-being/health of the system.

In yet another aspect, a non-transitory computer readable medium for message based communication and failure recovery for FPGA middleware framework is provided. The program includes. The program further includes receiving a plurality of Internet Protocol (IP) from a plurality of third party application as input to an active FPGA middleware framework, wherein the plurality of IP comprises a plurality of fragments and a sequence numbers corresponding to each of the plurality of fragments, wherein the plurality of fragments of the received plurality of IP comprises a Transmission Control Protocol (TCP) or a User Datagram Protocol (UDP). The program further includes re-assembling the received TCP and the received UDP, wherein the re-assembling is based on the sequence number of the plurality of fragments. The program further includes checking the re-assembled UDP for a missing sequence of fragments and requesting a re-transmission of the missing sequence of re-assembled UDP over a TCP channel from a plurality of third party application. The program further includes inserting the re-assembled UDP and the re-transmitted missing sequence of UDP to form a complete message with plurality of sequence numbers in the active FPGA middleware framework. The program further includes transmitting the complete message with plurality of sequence numbers from the active FPGA middleware framework to a passive FPGA middleware framework for maintaining a real-time and dynamic synchronization of the received IP between the active FPGA middleware framework and passive FPGA middleware framework. The program further includes detecting a failover of the active FPGA middleware framework based on transmission of a plurality of sequence numbers of transmitted complete message to the passive FPGA middleware, wherein the step of detecting a failover of the active FPGA middleware framework further comprises transmitting the complete message with plurality of sequence numbers from the active FPGA middleware framework to the passive FPGA middleware framework, receiving and saving the complete message with plurality of sequence numbers in the passive FPGA middleware framework for processing, transmitting a receipt from passive FPGA to active FPGA middleware framework, wherein the receipt comprises a saved previous consecutive sequence number of received complete message and finally detecting a failover of the active FPGA middleware framework based comparison of the received sequence number with the saved previous consecutive sequence in the passive FPGA. The program further includes recovering from the detected failover by activating the passive FPGA middleware framework after detecting a failure of the active FPGA middleware framework.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5 is an exemplary flow diagram illustrating the failure recovery techniques using active middleware framework and passive FPGA middleware frameworks for the proposed message based communication using FPGA middleware framework, in accordance with some embodiments of the present disclosure.

DETAILED DESCRIPTION OF EMBODIMENTS

Figure 1:
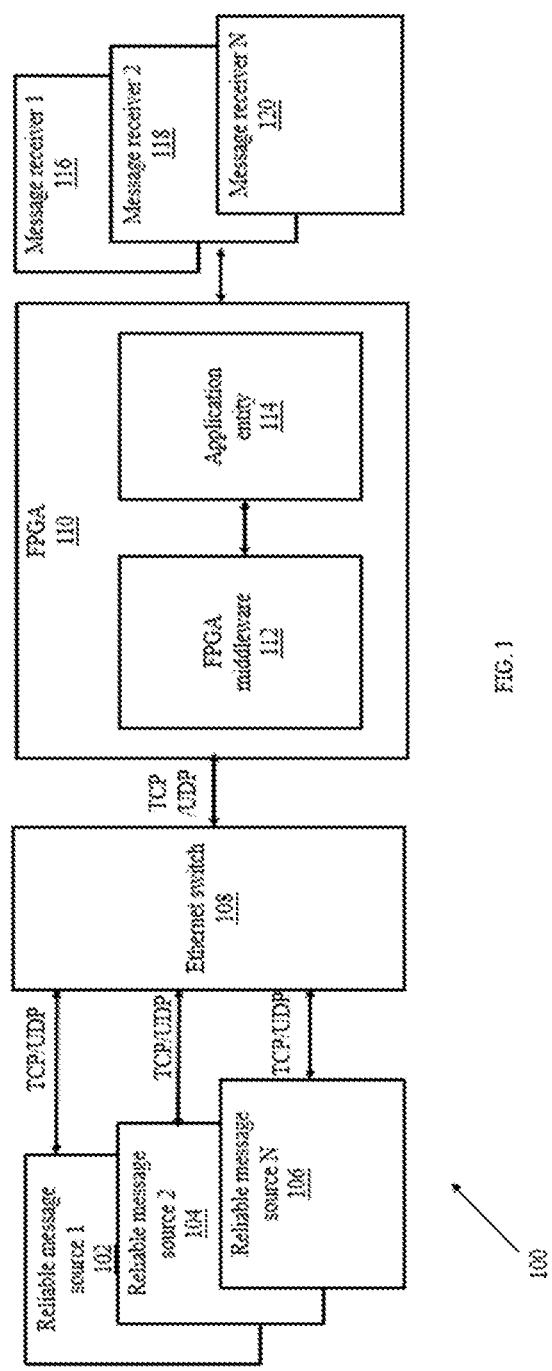
FIG. 1 illustrates an exemplary block diagram of a system for message based communication and failure recovery using a FPGA middleware framework according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary block diagram of a system 100 for message based communication and failure recovery using a FPGA middleware framework. In an embodiment, the system 100 includes plurality of reliable message sources, such as reliable message source 1 (102), reliable message source 2 (104) and reliable message source N (106). The plurality of reliable message sources are third party applications developed independently on different platforms. The reliable message source 1 (102), reliable message source 2 (104) and reliable message source N (106) communicates a service request to an Ethernet switch 108 using a plurality of Internet Protocol (IP), wherein the plurality of IP comprises a plurality of fragments and a sequence numbers corresponding to each of the plurality of fragments, wherein the plurality of fragments of the received plurality of IP comprises a Transmission Control Protocol (TCP) or a User Datagram Protocol (UDP).

The Ethernet switch 108 is further connected to an FPGA (110) which further comprises an FPGA middleware (112) and an application entity (114). The FPGA (110) is a middleware component between the Ethernet switch (108)

and a plurality of message receivers—message receiver 1 (116), message receiver 2 (118) and message receiver N (120). The service request from plurality of reliable message sources is serviced in the plurality of message receivers—message receiver (116), message receiver (118) and message receiver (120). Further after servicing the service request, a feedback of the serviced request is communicated back from the plurality of message receivers—message receiver 1 (116), message receiver 2 (118) and message receiver N (120) to the plurality of reliable message such as reliable message source 1 (102), reliable message source 2 (104) and reliable message source N (106) via the FPGA middleware framework 110 and Ethernet switch 108.

Figure 2:
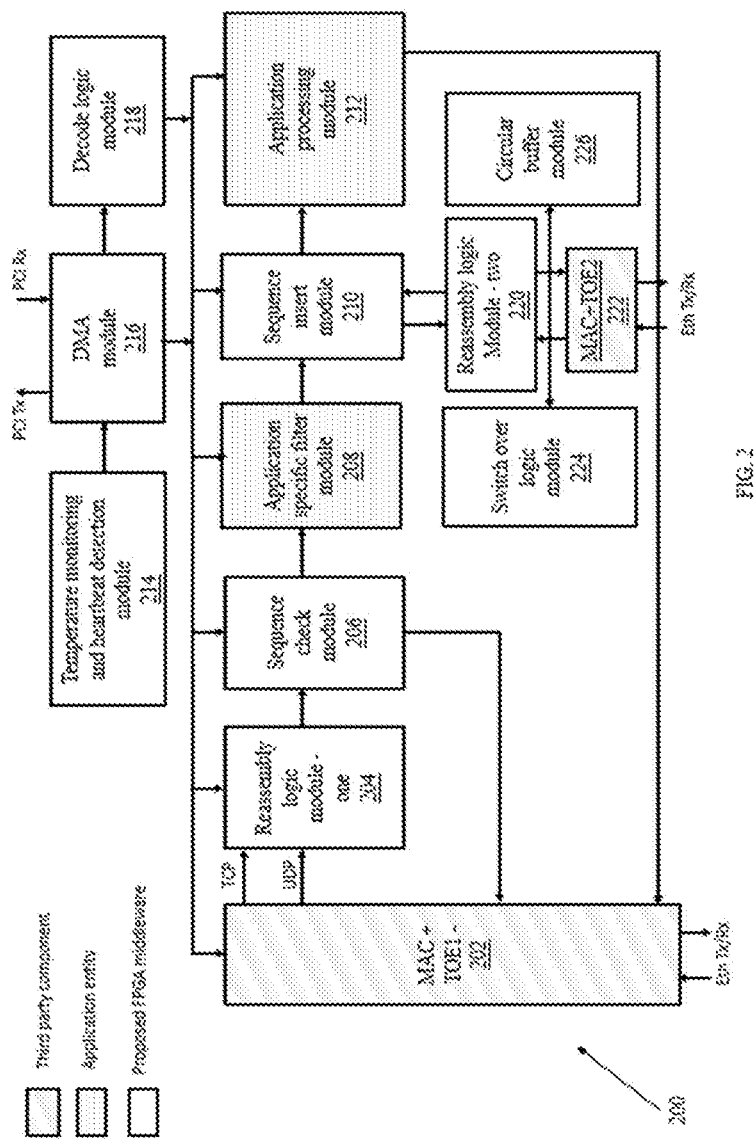
FIG. 2 is a functional block diagram of field-programmable gate array (FPGA) of the system of FIG. 1 according to some embodiments of the present disclosure.

FIG. 2, with reference to FIG. 1, is a block diagram of the field-programmable gate array (FPGA) (110) framework of the system of FIG. 1 according to some embodiments of the present disclosure. The FPGA (110) further comprises of the FPGA middleware (112) and the application entity (114). In an embodiment the FPGA middleware (112) comprises of plurality of active and passive FPGAs that are working in synchronization for message communication, also to detect failure and recovering from the detected failover by activating the passive FPGA middleware framework after detecting a failure of the active FPGA middleware framework. The application entity (114) is configured for processing the received plurality of Internet Protocol (IP) based on an application domain, wherein the application domain comprises of a plurality of domains that have a plurality of IP to be serviced with assistance of middleware framework. In an embodiment, the application domain may include a plurality of IP s generated from numerous domains that include marketing, retail, medical domains, and stock exchange.

In an embodiment of the present disclosure, the FIG. 2 comprises a MAC plus TCP Offload Engine-1 (TOE) (202), a reassembly logic module-1 (204), a sequence check module (206), an application specific filter module (208), a sequence insert module (210), an application processing module (212), temperature monitoring and heartbeat detection module (214), a DMA module (216), a decode logic module (218), a reassembly logic module-2 (220), a MAC+TOE2 (222), a switch over logic module (224) and a circular buffer module (226). The system 100 is implemented as at least one of a logically self-contained part of a software program, a self-contained hardware component, and/or, a self-contained hardware component with a logically self-contained part of a software program embedded into each of the hardware component that when executed perform the above method described herein.

In an embodiment of the disclosure, the system 100 comprises the MAC plus TCP Offload Engine (TOE)-1 (202) which is a third party application (reliable message source 1 (102), reliable message source 2 (104) and reliable message source N (106), which is a third party application developed independently on different platforms) that requires a variety of services. A plurality of Internet Protocol (IP) are generated by the plurality of third party components (MAC+TOE) as input to an active FPGA middleware framework. The plurality of IP comprises a plurality of fragments and a sequence numbers corresponding to each of the plurality of fragments, wherein the plurality of fragments of the received plurality of IP comprises a Transmission Control Protocol (TCP) or a User Datagram Protocol (UDP). The plurality of IP is communicated via Ethernet switch, as shown in FIG. 1 and represented as Eth Tx & Eth Rx in FIG. 2. The TCP message that reach the FPGA as bi-messages/partial messages are more reliable compared to UDP messages that may contain missing sequence of fragments. However message communication based on UDP is faster compared to TCP.

In one embodiment of the disclosure, the system 100 comprises the reassembly logic module-1 (204) that is configured for receiving the IP from plurality of third party components (MAC+TOE) as input. The plurality of IP comprises a plurality of fragments and a sequence numbers corresponding to each of the plurality of fragments. The plurality of fragments of the received plurality of IP comprises a Transmission Control Protocol (TCP) or a User Datagram Protocol (UDP). The TCP/UDP arrives as fragments with sequence numbers, where the fragments must be re-assembled as they arrive to obtain a complete TCP message. The reassembly logic module-1 (204) receives the IP and re-assembles the received TCP and the received UDP based on the sequence number of the plurality of fragments.

In one embodiment of the disclosure, the system 100 comprises the sequence check module (206) configured for checking the re-assembled UDP for a missing sequence of fragments. The sequence check module (206) is also configured for and requesting a re-transmission of the missing sequence of re-assembled UDP over a TCP channel from a plurality of third party application such as reliable message source 1 (102), reliable message source 2 (104) and reliable message source N (106), which is a third party application developed independently on different platforms. Since UDP messages are faster compared to TCP, it may contain missing sequence of fragments, hence the received UDP is checked for any missing sequence of fragments. The communication can be made reliable by using UDP over a TCP communication channel. Hence when the sequence check module (206) checks and identifies a missing sequence, a re-transmission of the missing sequence of re-assembled UDP is requested over a TCP channel from a plurality of third party application that has communicated the IP for a service request. The re-assembled UDP is transmitted over the TCP channel after encapsulating the missing sequence of re-assembled UDP over TCP. A reassembly logic module-2 (220) is configured for receiving and re-assembling the missing sequence of re-assembled UDP is transmitted over the TCP channel after encapsulating the missing sequence of re-assembled UDP over TCP. The re-transmitted missing sequence of UDP is received, re-assembled, checked for a second missing UDP, wherein for the second missing UDP a new re-transmission is requested for the third part component for the second missing UDP over the TCP channel. Hence the proposed techniques of UDP communication, makes UDP communication more reliable by using a reliable TCP channel.

Further, in some embodiments the checked sequence of re-assembled UDP/TCP are filtered in the application specific filter module (208) based on application domain requirements, wherein the application domain comprises of a plurality of domains that have a plurality of IP to be serviced with assistance of middleware framework. The application specific filter module (208) filters the checked sequence of re-assembled TCP/UPD data in a pre-defined manner as defined by the corresponding domain.

In one embodiment of the disclosure, the system 100 comprises the sequence insert module (210) that is configured for inserting the re-assembled UDP and the re-transmitted missing sequence of UDP to form a complete message with plurality of sequence numbers in the active FPGA middleware framework. The complete message with plurality of sequence numbers is shared with the circular buffer module (226) and the application processing module (212).

The complete message with plurality of sequence numbers is saved in the circular buffer module (226) for transmitting the complete message with plurality of sequence numbers from the active FPGA middleware framework to a passive FPGA middleware framework for maintaining a real-time and dynamic synchronization of the received IP between the active FPGA middleware framework and passive FPGA middleware framework.

The complete message with plurality of sequence numbers is also processed by the active FPGA middleware framework to share with the application processing module (212) that is configured for processing the filtered TCP/UDP based on application domain requirements, wherein, the application domain comprises of a plurality of domains that have a plurality of IP to be serviced with assistance of middleware framework.

In one embodiment of the disclosure, the system 100 comprises the temperature monitoring and heartbeat detection module (214), a DMA module (216), a decode logic module (218). The temperature monitoring and heartbeat detection module (214) is configured monitors the system 100 for increase in temperature and also monitors the general well-being/health of a passive FPGA middleware framework. The Direct Memory Access (DMA) module (216) is configured to communicate with an external Central Processing Unit (CPU) based on transmission and receiving of PCI (Peripheral Component Interconnect) which is represented as 'PCI Tx' and 'PCI Rx' in the FIG. 2. Further the decode logic module (218) is configured to decodes TCP/UDP messages, that would be communicated with various components on FPGA middleware framework.

In one embodiment of the disclosure, the system 100 comprises the switch over logic module (224) that is configured to activate the passive FPGA middleware framework after detecting a failure of the active FPGA middleware framework.

Figure 3A:
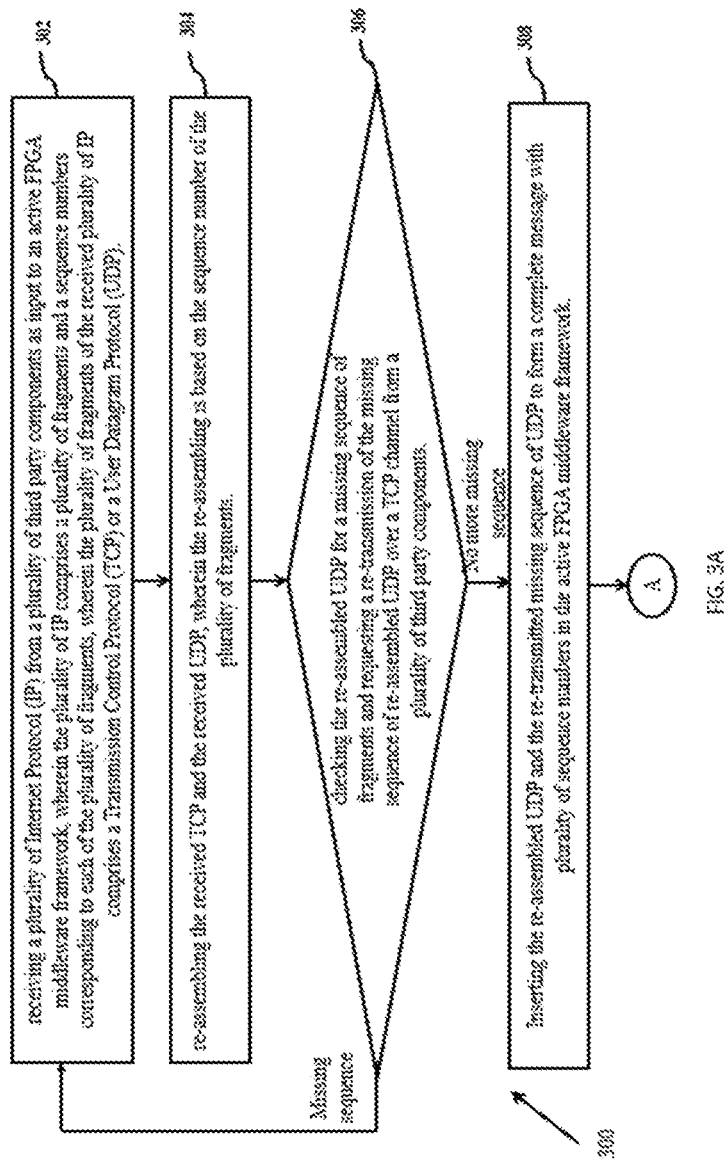
FIG. 3A and FIG. 3B are an exemplary flow diagram illustrating a method for message based communication using the system of FIG. 1 in accordance with some embodiments of the present disclosure.

FIGS. 3A and 3B are a flow diagram illustrating steps involved in a method (300) for message based communication using the system of FIG. 1 and FIG. 2 in accordance with some embodiments of the present disclosure.

As depicted in FIG. 3A and FIG. 3B, at step 302 the method 300 includes receiving a plurality of Internet Protocol (IP) from a plurality of third party components reliable message source 1 (102), reliable message source 2 (104) and reliable message source N (106), which is a third party application developed independently on different platforms) as input to an active FPGA middleware framework, wherein the plurality of IP comprises a plurality of fragments and a sequence numbers corresponding to each of the plurality of fragments, wherein the plurality of fragments of the received plurality of IP comprises a Transmission Control Protocol (TCP) or a User Datagram Protocol (UDP).

At step 304, the method 300 includes re-assembling the received TCP and the received UDP, wherein the re-assembling is based on the sequence number of the plurality of fragments in the reassembly logic module-1 (204). The TCP/UDP arrives as fragments with sequence numbers, where the fragments must be re-assembled as they arrive to obtain a complete TCP message. The reassembly logic module-1 (204) receives the IP and re-assembles the received TCP and the received UDP based on the sequence number of the plurality of fragments.

At step 306, the method 300 includes checking the re-assembled UDP for a missing sequence of fragments and requesting a re-transmission of the missing sequence of re-assembled UDP over a TCP channel from a plurality of third party components in the sequence check module (206).

Upon checking and identification of a missing sequence, a re-transmission of the missing sequence of re-assembled UDP is requested over a TCP channel from a plurality of third party application that has communicated the IP for a service request. The re-assembled UDP is transmitted over the TCP channel after encapsulating the missing sequence of re-assembled UDP over TCP. A reassembly logic module-2 (220) is configured for receiving and re-assembling the missing sequence of re-assembled UDP is transmitted over the TCP channel after encapsulating the missing sequence of re-assembled UDP over TCP. The re-transmitted missing sequence of UDP is received, re-assembled, checked for a second missing UDP, wherein for the second missing UDP a new re-transmission is requested for the third part component for the second missing UDP over the TCP channel. Hence the proposed techniques of UDP communication, makes UDP communication more reliable by using a reliable TCP channel. Further the application specific filter module (208) filters the checked sequence of re-assembled TCP/UPD data in a pre-defined manner as defined by the corresponding domain.

At step 308, the method 300 includes inserting the re-assembled UDP and the re-transmitted missing sequence of UDP to form a complete message with plurality of sequence numbers in the active FPGA middleware framework. The complete message with plurality of sequence numbers is shared with the circular buffer module (226) and the application processing module (212).

At step 310, the method 300 includes transmitting the complete message with plurality of sequence numbers from the active FPGA middleware framework to a passive FPGA middleware framework for maintaining a real-time and dynamic synchronization of the received IP between the active FPGA middleware framework and passive FPGA middleware framework.

At step 312, the method 300 includes detecting a failover of the active FPGA middleware framework based on transmission of a plurality of sequence numbers of transmitted complete message to the passive FPGA middleware framework.

At step 314, the method 300 includes recovering from the detected failover by activating the passive FPGA middleware framework after detecting a failure of the active FPGA middleware framework. The recovery and activation of the passive FPGA middleware framework is performed by the switch over logic module (224).

Figure 4:
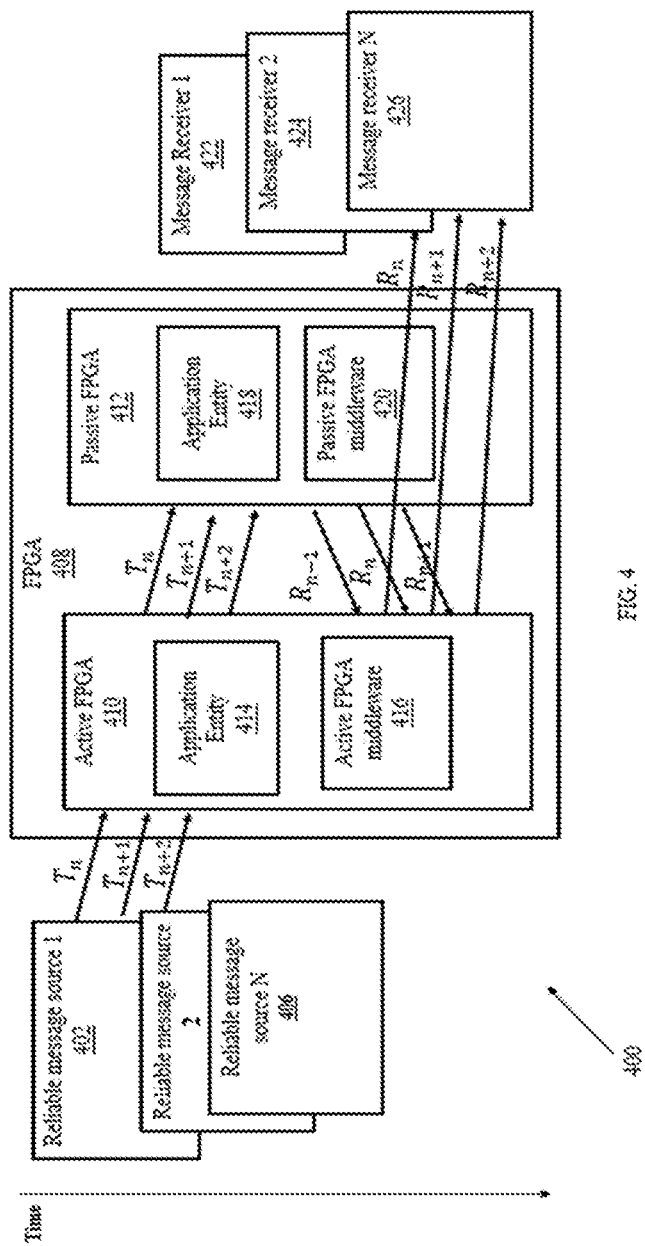
FIG. 4 illustrates an exemplary block diagram for illustrating the failure recovery techniques using active middleware framework and passive FPGA middleware framework for the message based architecture using FPGA middleware framework in accordance with some embodiments of the present disclosure.
Figure 3:
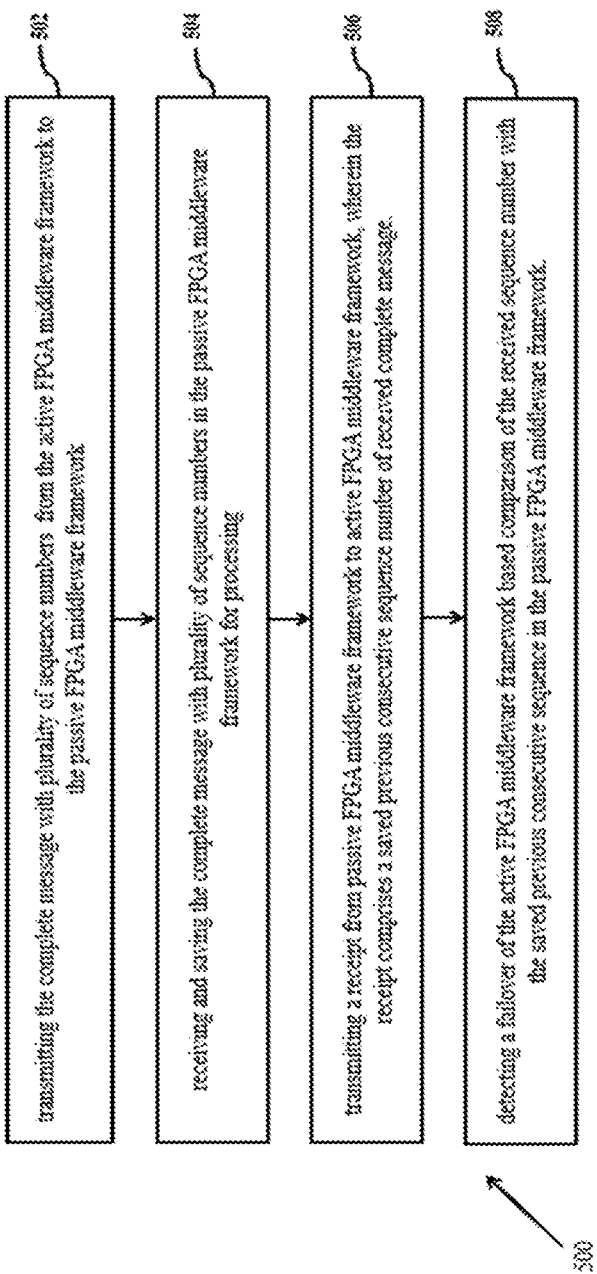

FIG. 4 illustrates an exemplary block diagram of a system 400 for illustrating the failure recovery techniques using active and passive FPGA middleware frameworks for the message based architecture using FPGA middleware framework in accordance with some embodiments of the present disclosure. In an embodiment of the present disclosure, the FIG. 4 comprises a plurality of reliable message sources that include reliable message source 1 (402), a reliable message source 2 (404), a reliable message source N (408), a FPGA (408) that includes an active FPGA (410) and a passive FPGA (412). The active FPGA (410) further comprises an application entity (418) and an active FPGA middleware (416) framework. The passive FPGA (412) comprises an application entity (414) and an FPGA middleware (420) framework. Further the system 400 further comprises message receiver 1 (422), message receiver 2 (424), message receiver N (426).

In an embodiment, every complete message with plurality of sequence numbers is transmitted from the active FPGA middleware (416) framework to a passive FPGA middleware (420) framework for maintaining a real-time and dynamic synchronization of the received IP between the active FPGA middleware (416) framework and passive FPGA middleware (420) framework. A failover of the active FPGA middleware (416) framework is detected based on transmission of a plurality of sequence numbers of transmitted complete message to the passive FPGA middleware (420) framework. The steps for detection of failover includes receiving and saving the complete message with plurality of sequence numbers in the passive FPGA (412) for processing. Upon receiving the complete message, a receipt is transmitted from the passive FPGA (412) to active FPGA (410), wherein the receipt comprises a saved previous consecutive sequence number of received complete message. Further the passive FPGA (412) constantly compares received sequence number with the saved previous consecutive sequence to detect a failover, which can be expressed as shown below:

$$T_n > T_{(n-1)} > T_{(n-2)} \ldots > T_1$$

$$R_n > R_{(n-1)} > R_{(n-2)} \ldots > R_1$$

$$R_n > T_n$$

where, $T_n$ is transaction message with sequence number as subscript transmitted from active FPGA middleware $R_n$ is transaction complete (receipt) with sequence number as sub-script transmitted from active FPGA middleware.

Further the active FPGA (410) continuously monitors the health of passive FPGA architecture framework 404 using the temperature monitoring and heartbeat detection module (214) as explained in FIG. 2 to detect any possible failure. Upon detection of failover of active FPGA (410), the passive FPGA (412) is activated with minimum latency as the FPGAs are in a real-time and dynamic synchronization with respect to communication of complete messages, as explained above.

FIG. 5 is an exemplary flow diagram illustrating steps involved in a method 500 the failure recovery techniques using active FPGA middleware (416) framework and passive FPGA middleware (420) framework for the proposed message based architecture using FPGA middleware framework, using the system of FIG. 4 in accordance with some embodiments of the present disclosure.

As depicted in FIG. 5, at step 502 the method 500 includes transmitting the complete message with plurality of sequence numbers from the active FPGA middleware (416) framework to the passive FPGA middleware (420) framework.

At step 504, the method 500 includes receiving and saving the complete message with plurality of sequence numbers in the passive FPGA middleware (420) framework for processing.

At step 506, the method 500 includes transmitting a receipt from the passive FPGA middleware (420) framework to active FPGA middleware (416) framework to, wherein the receipt comprises a saved previous consecutive sequence number of received complete message, which can be expressed as shown below $$T_n > T_{(n-1)} > T_{(n-2)} \ldots > T_1$$

$$R_n > R_{(n-1)} > R_{(n-2)} \ldots > R_1$$

$$R_n > T_n$$

where, $T_n$ is transaction message with sequence number as subscript transmitted from active FPGA middleware $R_n$ is transaction complete (receipt) with sequence number as sub script transmitted from active FPGA middleware.

At step 508, the method 500 includes detecting a failover of the active FPGA middleware (416) framework based comparison of the received sequence number with the saved previous consecutive sequence in the passive FPGA middleware (420) framework.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein describe a method and a system for message based communication and failure recovery for FPGA middleware framework. The message based communication architecture built on a FPGA framework performs middleware activities that would enable reliable communication using TCP/UDP between different platforms such as end users/clients, software components, or hardware/FPGA components regardless of their deployment. The proposed FPGA middleware framework provides for reliable communication as well as failure recovery with minimum latency during a failover of an active FPGA framework during its operation, by using a passive FPGA in real-time and dynamic synchronization with the active FPGA.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for message based communication and failure recovery for Field-Programmable Gate Array (FPGA) middleware framework, the method comprising:
    receiving a plurality of Internet Protocol (IP) from a plurality of third party application as input to an active FPGA middleware framework, wherein the plurality of IP comprises a plurality of fragments and a sequence numbers corresponding to each of the plurality of fragments, wherein the plurality of fragments of the received plurality of IP comprises a Transmission Control Protocol (TCP) or a User Datagram Protocol (UDP);
    re-assembling the received TCP and the received UDP, wherein the re-assembling is based on the sequence number of the plurality of fragments;
    checking the re-assembled UDP for a missing sequence of fragments and requesting a re-transmission of the missing sequence of re-assembled UDP over a TCP channel from a plurality of third party application;
    inserting the re-assembled UDP and the re-transmitted missing sequence of UDP to form a complete message with plurality of sequence numbers in the active FPGA middleware framework;
    transmitting the complete message with plurality of sequence numbers from the active FPGA middleware framework to a passive FPGA middleware framework for maintaining a real-time and dynamic synchronization of the received IP between the active FPGA middleware framework and passive FPGA middleware framework;
    detecting a failover of the active FPGA middleware framework based on transmission of a plurality of sequence numbers of transmitted complete message to the passive FPGA middleware; and
    recovering from the detected failover by activating the passive FPGA middleware framework after detecting a failure of the active FPGA middleware framework.

2. The method of claim 1, wherein the missing sequence of re-assembled UDP is transmitted over the TCP channel after encapsulating the missing sequence of re-assembled UDP over TCP.

3. The method of claim 2, wherein the re-transmitted missing sequence of UDP is received, re-assembled, checked for a second missing UDP.

4. The method of claim 3, wherein for the second missing UDP a new re-transmission is requested for the third part application for the second missing UDP over the TCP channel.

5. The method of claim 1, wherein the step of detecting a failover of the active FPGA middleware framework further comprising:
    transmitting the complete message with plurality of sequence numbers from the active FPGA middleware framework to the passive FPGA middleware framework;
    receiving and saving the complete message with plurality of sequence numbers in the passive FPGA middleware framework for processing;
    transmitting a receipt from passive FPGA to active FPGA middleware framework, wherein the receipt comprises a saved previous consecutive sequence number of received complete message; and
    detecting a failover of the active FPGA middleware framework based comparison of the received sequence number with the saved previous consecutive sequence in the passive FPGA.

6. A system for message based communication and failure recovery for Field-Programmable Gate Array (FPGA) middleware framework, comprising an active FPGA middleware framework and a passive FPGA middleware framework that includes:
    a reassembly logic module-1 configured for:
        receiving a plurality of Internet Protocol (IP) from a plurality of third party components as input to an active FPGA middleware framework, wherein the plurality of IP comprises a plurality of fragments and a sequence numbers corresponding to each of the plurality of fragments, wherein the plurality of fragments of the received plurality of IP comprises a Transmission Control Protocol (TCP) or a User Datagram Protocol (UDP); and
        re-assembling the received TCP and the received UDP, wherein the re-assembling is based on the sequence number of the plurality of fragments;
    a sequence check module configured for checking the re-assembled UDP for a missing sequence of fragments and requesting a re-transmission of the missing sequence of re-assembled UDP over a TCP channel from a plurality of third party components;

a sequence insert module configured for inserting the re-assembled UDP and the re-transmitted missing sequence of UDP to form a complete message with plurality of sequence numbers in the active FPGA middleware framework; and a switch over logic module configured for:
  detecting a failover of the active FPGA middleware framework based on transmission of a plurality of sequence numbers of transmitted complete message to the passive FPGA middleware framework; and
  recovering from the detected failover by activating the passive FPGA middleware framework after detecting a failure of the active FPGA middleware framework.

7. The system of claim 6, further includes application entities that comprises:
  an application specific filter module configured to filter the checked sequence of re-assembled UDP/TCP based on application domain requirements, wherein the application domain comprises of a plurality of domains that have a plurality of IP to be serviced with assistance of middleware framework; and
  an application processing module configured for processing the filtered TCP/UDP based on application domain requirements, wherein, the application domain comprises of a plurality of domains that have a plurality of IP to be serviced with assistance of middleware framework.

8. The system of claim 6, wherein a reassembly logic module-2 is configured for receiving and re-assembling the missing sequence of re-assembled UDP is transmitted over the TCP channel after encapsulating the missing sequence of re-assembled UDP over TCP.

9. The system of claim 6, wherein the complete message with plurality of sequence numbers is saved in a circular buffer module.

10. The system of claim 6, for detecting a failover further comprises temperature monitoring and heartbeat detection module configured to monitor an FPGA middleware framework for increase in temperature and also monitors the general well-being/health of the system.

11. A computer program product comprising a non-transitory computer readable medium having a computer readable program embodied therein, wherein the computer readable program, when executed on a computing device, causes the computing device to:
  receiving a plurality of Internet Protocol (IP) from a plurality of third party application as input to an active Field-Programmable Gate Array (FPGA) middleware framework, wherein the plurality of IP comprises a plurality of fragments and a sequence numbers corresponding to each of the plurality of fragments, wherein the plurality of fragments of the received plurality of IP comprises a Transmission Control Protocol (TCP) or a User Datagram Protocol (UDP);
  re-assembling the received TCP and the received UDP, wherein the re-assembling is based on the sequence number of the plurality of fragments;
  checking the re-assembled UDP for a missing sequence of fragments and requesting a re-transmission of the missing sequence of re-assembled UDP over a TCP channel from a plurality of third party application;
  inserting the re-assembled UDP and the re-transmitted missing sequence of UDP to form a complete message with plurality of sequence numbers in the active FPGA middleware framework;
  transmitting the complete message with plurality of sequence numbers from the active FPGA middleware framework to a passive FPGA middleware framework for maintaining a real-time and dynamic synchronization of the received IP between the active FPGA middleware framework and passive FPGA middleware framework;
  detecting a failover of the active FPGA middleware framework based on transmission of a plurality of sequence numbers of transmitted complete message to the passive FPGA middleware; and
  recovering from the detected failover by activating the passive FPGA middleware framework after detecting a failure of the active FPGA middleware framework.

* * * * *